(12) United States Patent
Moore et al.

(10) Patent No.: US 11,922,702 B2
(45) Date of Patent: Mar. 5, 2024

(54) ENHANCED OBJECT DETECTION

(71) Applicant: Ford Global Technologies, LLC, Dearborn, MI (US)

(72) Inventors: John Moore, Canton, MI (US); Sahib Singh, Dearborn, MI (US); Uttara Thakre, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 371 days.

(21) Appl. No.: 17/406,381

(22) Filed: Aug. 19, 2021

(65) Prior Publication Data
US 2023/0053786 A1 Feb. 23, 2023

(51) Int. Cl.
| | |
|---|---|
| G06V 20/58 | (2022.01) |
| G06F 18/214 | (2023.01) |
| G06F 18/22 | (2023.01) |
| G06N 3/08 | (2023.01) |
| G06V 10/26 | (2022.01) |

(52) U.S. Cl.
CPC ............ *G06V 20/58* (2022.01); *G06F 18/214* (2023.01); *G06F 18/22* (2023.01); *G06N 3/08* (2013.01); *G06V 10/26* (2022.01)

(58) Field of Classification Search
CPC . G06T 2207/20081; G06T 7/11; G06N 20/00; G06N 3/08; G06V 20/58; G06V 10/26; G06F 18/22; G06F 18/214
See application file for complete search history.

(56) References Cited

U.S. PATENT DOCUMENTS

| | | | |
|---|---|---|---|
| 10,410,092 B1 * | 9/2019 | Chen | G06V 10/764 |
| 11,176,427 B2 * | 11/2021 | Rozner | G06V 10/82 |
| 2009/0136125 A1 * | 5/2009 | Fujita | G06T 7/48 |
| | | | 382/165 |
| 2013/0195359 A1 * | 8/2013 | Yabu | G06T 7/194 |
| | | | 382/171 |
| 2016/0140422 A1 * | 5/2016 | Saruta | G06F 18/21 |
| | | | 382/159 |
| 2020/0242357 A1 * | 7/2020 | Brouard | G06F 18/214 |
| 2020/0356209 A1 * | 11/2020 | Yang | G06N 20/00 |
| 2021/0089570 A1 | 3/2021 | Hunter et al. | |
| 2023/0027114 A1 * | 1/2023 | Johnston | G06N 3/08 |

FOREIGN PATENT DOCUMENTS

| | | | | |
|---|---|---|---|---|
| CN | 103514456 A | * | 1/2014 | |
| CN | 109166133 A | * | 1/2019 | ............. G06T 7/136 |
| DE | 102012005325 A1 | * | 9/2013 | ....... G06F 17/30247 |
| DE | 102016207209 A1 | * | 11/2016 | |
| DE | 102018005865 A1 | * | 7/2019 | |
| DE | 102019204187 A1 | * | 5/2020 | |
| KR | 10-1919286 B1 | | 11/2018 | |
| WO | WO-0030056 A1 | * | 5/2000 | ............. B60K 35/00 |
| WO | WO-2019014649 A1 | * | 1/2019 | ........... G06K 9/4642 |

* cited by examiner

*Primary Examiner* — Dung Hong
(74) *Attorney, Agent, or Firm* — Brandon Hicks; Bejin Bieneman PLC

(57) ABSTRACT

A plurality of subimages of an image are generated based on output from a random number generator. Each subimage is input to a machine learning program trained to output an object classified in the subimage. When a number of subimages with a same classified object exceeds a threshold, an object in the image is identified as the classified object.

20 Claims, 5 Drawing Sheets

ENHANCED OBJECT DETECTION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use computing devices configured to identify objects from image data collected by the vehicle sensors.

DETAILED DESCRIPTION

Figure 1:
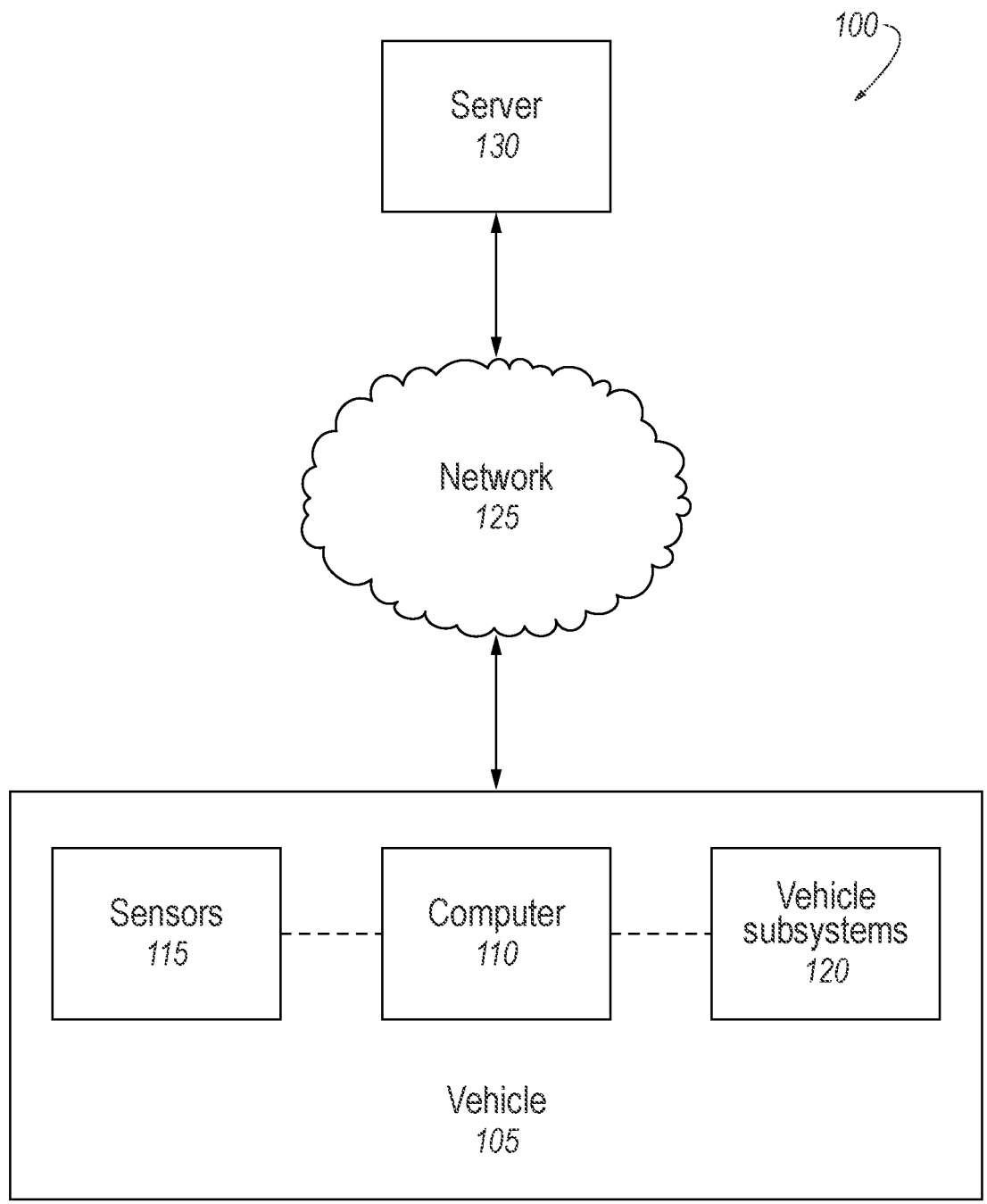
FIG. 1 is a block diagram of an example system for identifying an object in an image.

A system includes a computer including a processor and a memory, the memory storing instructions executable by the processor to generate, based on output from a random number generator, a plurality of subimages, wherein each subimage is a set of at least two divisions of an image, each division of the image being a portion of the image different than each other division of the image, input each subimage to a machine learning program trained to output an object classified in the subimage, and, when a number of subimages with a same classified object exceeds a threshold, identify an object in the image as the classified object.

The instructions can further include instructions to divide the image into a plurality of divisions and to generate the output from the random number generator based on a total number of the plurality of divisions.

The instructions can further include instructions to input an annotation identifying the object in the image to the machine learning program and to determine whether the annotation matches the classified object output from the machine learning program.

The instructions can further include instructions to input the matching determination into a training dataset of the machine learning program.

The instructions can further include instructions to, when no number of subimages with the same classified object exceeds the threshold, input the image to a second machine learning program trained to output the object identified in the image.

The instructions can further include instructions to assign an identifying number to each of the divisions, the identifying numbers defining a set, and the output of the random number generator is a subset of the set of the identifying numbers.

The machine learning program can be a multi-task neural network, wherein each task of the multi-task network can be programmed to classify a specific type of object different from the other tasks.

The instructions can further include instructions to identify a plurality of classification regions in the image, each classification region being a region in the image that the machine learning program outputs an identification of an object, and to determine a number of divisions of the image based on the identified plurality of classification regions.

The instructions can further include instructions to generate at least one division that includes no classification regions.

The instructions can further include instructions to, when the object is identified in the image, actuate a vehicle subsystem based on the identified object.

The instructions can further include instructions to divide the image into a plurality of equally-sized divisions in a grid pattern.

The instructions can further include instructions to generate the plurality of subimages based on the divisions in the grid pattern, to divide the image into a second plurality of equally-sized divisions in a second grid pattern, and to generate a second plurality of subimages based on the divisions in the second grid pattern.

A method includes generating, based on output from a random number generator, a plurality of subimages, wherein each subimage is a set of at least two divisions of an image, each division of the image being a portion of the image different than each other division of the image, inputting each subimage to a machine learning program trained to output an object classified in the subimage, and, when a number of subimages with a same classified object exceeds a threshold, identifying an object in the image as the classified object.

The method can further include dividing the image into a plurality of divisions and generating the output from the random number generator based on a total number of the plurality of divisions.

The method can further include inputting an annotation identifying the object in the image to the machine learning program and determining whether the annotation matches the classified object output from the machine learning program.

The method can further include inputting the matching determination into a training dataset of the machine learning program.

The method can further include, when no number of subimages with the same classified object exceeds the threshold, inputting the image to a second machine learning program trained to output the object identified in the image.

The method can further include assigning an identifying number to each of the divisions, the identifying numbers defining a set, and the output of the random number generator can be a subset of the set of the identifying numbers.

The method can further include identifying a plurality of classification regions in the image, each classification region being a region in the image that the machine learning program outputs an identification of an object, and determining a number of divisions of the image based on the identified plurality of classification regions.

The method can further include generating at least one division that includes no classification regions.

The method can further include, when the object is identified in the image, actuating a vehicle subsystem based on the identified object.

The method can further include dividing the image into a plurality of equally-sized divisions in a grid pattern.

The method can further include generating the plurality of subimages based on the divisions in the grid pattern, dividing the image into a second plurality of equally-sized divisions in a second grid pattern, and generating a second plurality of subimages based on the divisions in the second grid pattern.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Detecting an object in an image with a conventional object detection program can result in differing classifications of the same object in images that only differ slightly. For example, adjustment of a small subset of pixels in an image may cause a neural network to change its output of the object identified in the image. These adjustments of pixels may be caused by, e.g., debris, changes to ambient lighting, sensor movement, etc.

As described herein, a plurality of subimages generated from random divisions of an image in a classification program can be employed to improve object detection by training the classification program to identify objects in different subsets of the image that the object detection program may detect. from which An object in an image can be identified by a computer such as a computer in a vehicle dividing an image into subimages based on a grid pattern of equally sized divisions. The subimages can be determined with a random number generator. Then a classification program can generate a plurality of output object classifications from the subimages. When a number of output classifications that are a same object classification exceeds a threshold, the computer can determine that the object in the original image is the object classification output from the classification program. Thus, by using the classification program with the subimages, the computer can more readily identify objects that may not be detected by other object detection programs.

FIG. 1 is a block diagram of an example system 100 for identifying objects in an image. The system 100 includes a vehicle 105 and a vehicle computer 110. A vehicle 105 may be any suitable type of ground vehicle 105, e.g., a passenger or commercial automobile such as a sedan, a coupe, a truck, a sport utility, a crossover, a van, a minivan, a taxi, a bus, etc.

The vehicle computer 110 includes a processor and a memory. The memory includes one or more forms of computer 110 readable media, and stores instructions executable by the vehicle computer 110 for performing various operations, including as disclosed herein. For example, the computer 110 can be a generic computer 110 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 110. The memory can be of any type, e.g., hard disk drives, solid state drives, servers 130, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

The computer 110 may include programming to operate one or more of vehicle brakes, propulsion e.g., control of acceleration in the vehicle 105 by controlling one or more of an internal combustion engine, electric motor, hybrid engine, etc., steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle network such as a communications bus as described further below, more than one processor, e.g., included in components such as sensors 115, electronic control units (ECUs) or the like included in the vehicle 105 for monitoring and/or controlling various vehicle components, e.g., a powertrain controller, a brake controller, a steering controller, etc. The computer 110 is generally arranged for communications on a vehicle 105 communication network that can include a bus in the vehicle 105 such as a controller area network CAN or the like, and/or other wired and/or wireless mechanisms. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicles 105, such as autonomous or semi-autonomous vehicles 105, typically include a variety of sensors 115. A sensor is a device that can obtain one or more measurements of one or more physical phenomena. Some sensors 115 detect internal states of the vehicle 105, for example, wheel speed, wheel orientation, and engine and transmission variables. Some sensors 115 detect the position or orientation of the vehicle 105, for example, global positioning system GPS sensors 115; accelerometers such as piezo-electric or micro-electromechanical systems MEMS; gyroscopes such as rate, ring laser, or fiber-optic gyroscopes; inertial measurements units IMU; and magnetometers. Some sensors 115 detect the external world, for example, radar sensors 115, scanning laser range finders, light detection and ranging LIDAR devices, and image 200 processing sensors 115 such as cameras. A LIDAR device detects distances to objects by emitting laser pulses and measuring the time of flight for the pulse to travel to the object and back. Some sensors 115 are communications devices, for example, vehicle-to-infrastructure V2I or vehicle-to-vehicle V2V devices. Sensor operation can be affected by obstructions, e.g., dust, snow, insects, etc. Often, but not necessarily, a sensor includes a digital-to-analog converter to converted sensed analog data to a digital signal that can be provided to a digital computer 110, e.g., via a network. Sensors 115 can include a variety of devices, and can be disposed to sense and environment, provide data about a machine, etc., in a variety of ways. For example, a sensor could be mounted to a stationary infrastructure element on, over, or near a road. Moreover, various controllers in a vehicle 105 may operate as sensors 115 to provide data via the vehicle network or bus, e.g., data relating to vehicle speed, acceleration, location, subsystem and/or component status, etc. Further, other sensors 115, in or on a vehicle 105, stationary infrastructure element, etc., infrastructure could include cameras, short range radar, long range radar, LIDAR, and/or ultrasonic transducers, weight sensors 115, accelerometers, motion detectors, etc., i.e., sensors 115 to provide a variety of data. To provide just a few non-limiting examples, sensor data could include data for determining a position of a component, a location of an object, a speed of an object, a type of an object, a slope of a roadway, a temperature, a presence or amount of moisture, a fuel level, a data rate, etc.

A vehicle subsystem 120 is a set of components or parts, including hardware components and typically also software and/or programming, to perform a function or set of operations in the vehicle 105. Vehicle subsystems 120 typically include, without limitation, a braking system, a propulsion system, and a steering system. The propulsion subsystem converts energy to rotation of vehicle wheels to propel the vehicle 105 forward and/or backward. The braking subsystem can slow and/or stop vehicle movement. The steering subsystem can control a yaw, e.g., turning left and right, maintaining a straight path, of the vehicle 105 as it moves.

A computer 110 can be programmed to communicate with one or more remote sites such as a server 130, via a wide area network 125. The wide area network 125 can include one or more mechanisms by which a vehicle computer 110 may communicate with, for example, a remote server 130. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle to everything V2X such as cellular V2X CV2X, Dedicated Short Range Communications DSRC, etc., local area networks LAN and/or wide area networks WAN, including the Internet, providing data communication services.

Figure 2:
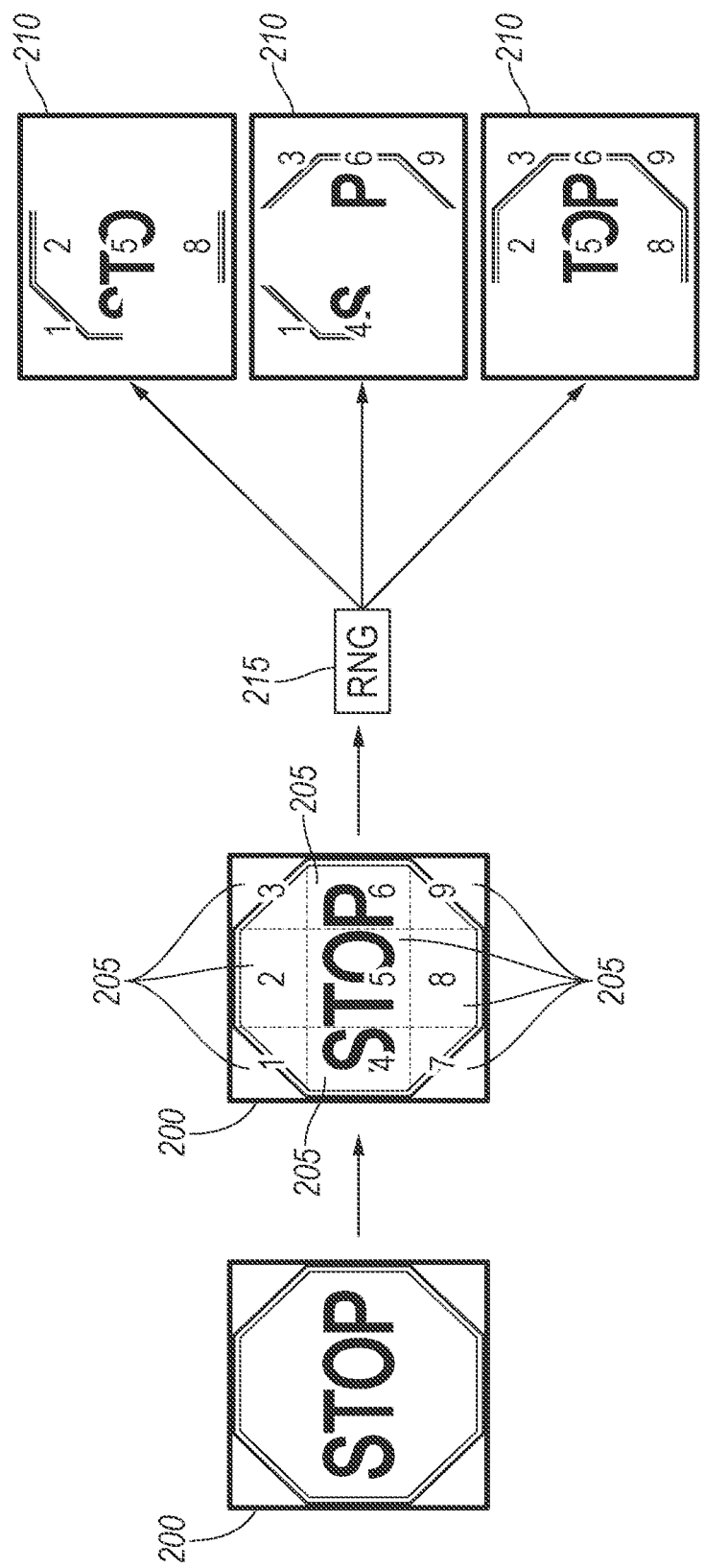
FIG. 2 is a diagram of a plurality of subimages of the image.

FIG. 2 is a view of an example image 200 divided into divisions 205 and subimages 210 with a random number generator 215. By generating subimages 210 from the divisions 205 with the random number generator 215, the computer 110 or the server 130 can train an image processing program to identify objects in images 200 when the objects are partially obscured. The computer 110 can collect the images 200 with a suitable sensor 115, e.g., a camera. The images 200 may include objects that, upon detection, may cause a change in operation of the vehicle 105. For example, a road sign may include information to cause a change in operation of the vehicle 105, such as a stop sign that requires the vehicle 105 to stop. Detecting objects in the images 200 allows the computer 110 to actuate one or more subsystems 120 to change operation of the vehicle 105, e.g., actuating a brake to stop the vehicle 105 prior to reaching the stop sign.

A "division" of an image 200 is a portion of the image 200 that is different from other portions of the image 200. That is, the divisions 205 do not overlap one another and collectively comprise the entire image 200. The computer 110 can divide the image 200 into divisions 205 based on a specified pattern, e.g., a 3×3 grid pattern as shown in FIG. 2. Alternatively, the computer 110 can divide the image 200 based on a different pattern, e.g., a 1×4 pattern, a 2×2 pattern, a 2×4 pattern, etc. The computer 110 can divide the image 200 into a plurality of equally-sized divisions 205. The computer 110 can assign an identifying number to each of the divisions 205, e.g., an integer from 1 to the total number of divisions 205. For example, in FIG. 2, the image 200 can be divided into 9 divisions 205, each assigned an integer from 1 to 9.

A "subimage" 210 is a set of at least two divisions 205, as shown in FIG. 2. That is, the subimage 210 can include fewer than all of the divisions 205 of the image 200. Because the subimage 210 can include fewer than all divisions 205, the subimage 210 can represent an image 200 that is obscured by, e.g., debris, precipitation, etc. The computer 110 can generate a plurality of subimages 210, each subimage 210 being a different subset of divisions 205 from each other subimage 210. The computer 110 can generate the plurality of subimages 210 based on one or more grid patterns described above. For example, the computer 110 can generate a first plurality of subimages 210 based on divisions 205 of a first grid pattern and a second plurality of subimages 210 based on divisions 205 of a second grid pattern.

The computer 110 can generate the subimages 210 based on output from a random number generator 215 (RNG). A "random number generator" is a program that, typically pseudo-randomly, generates a string of output numbers from a set of input numbers. For example, from a set of integers 1-9, the RNG 215 outputs a subset of the input set, i.e., an output set that has elements that are all also members of the input set. The output subset can be a smaller set than the input set, i.e., some but not all of the integers from 1-9. The input to the RNG 215 can be based on a total number of divisions 205, e.g., 9 in the example of FIG. 2. Based on the output of the RNG 215, the computer 110 can generate subimages 210. For example, the RNG 215 can output a subset of integers, each element of the subset being an integer associated to one of the divisions 205 of the image 200. The computer 110 can generate a subimage 210 including only the divisions 205 having associated identifying numbers in the subset output from the RNG 215. The example of FIG. 2 shows three subimages 210, a first subimage 210 generated from RNG output [1, 2, 5, 8], a second subimage 210 generated from RNG output [1, 3, 4, 6, 9], and a third subimage 210 generated from RNG output [2, 3, 5, 6, 8, 9].

The image 200 can include one or more classification regions. A "classification region" is a set of pixels in the image 200 that an image 200 processing program uses to identify an object in the image 200. That is, conventional image 200 processing programs may identify objects based on specific sets of pixels in an image 200, e.g., a letter "O" in a stop sign. When the classification regions are obscured, the image 200 processing program may incorrectly identify the object in the image 200. To train the image 200 processing program to identify the object in the image 200 correctly, the computer 110 can generate subimages 210 that do not include the classification regions. That is, the divisions 205 can be determined such that at least one division 205 does not include any classification regions, and preferably a plurality of subimages 210 can be generated lacking the classification regions to train the image 200 processing program.

Figure 3:
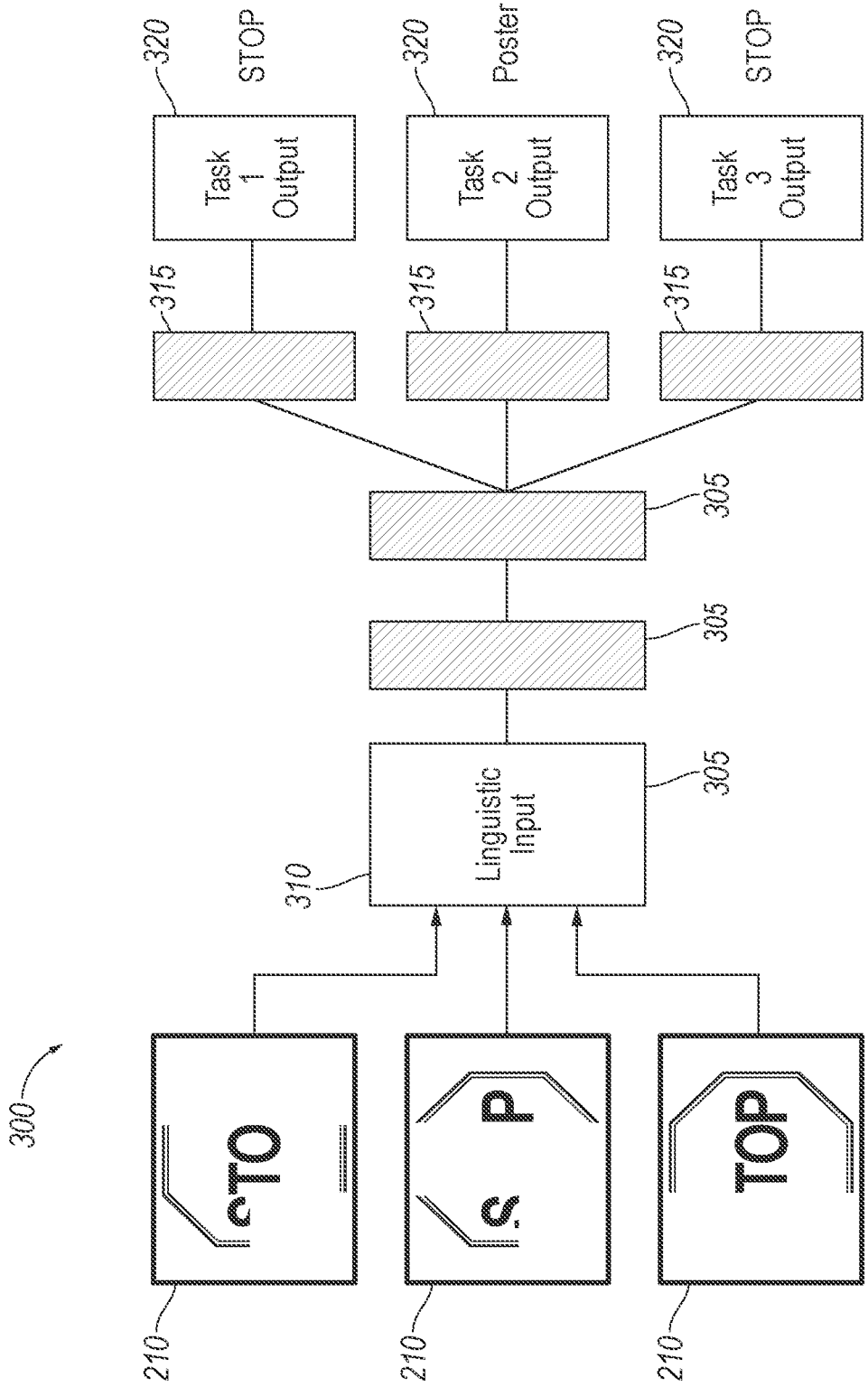
FIG. 3 is a diagram of an example classification program.

FIG. 3 is a block diagram of an example classification program 300 trained by the computer 110 or the server 130 to output an object classified in an image 200 based on a set of input subimages 210. The classification program 300 is a machine learning program that receives one or more subimages 210 as input and outputs a classification of an object for the image 200 from which the subimages 210 were generated. The classification program 300 can be a multitask neural network trained to identify objects in the subimages 210. A multi-task neural network includes a plurality of layers 305, each layer 305 providing information about the input to classify objects in the image 200.

The classification program 300 can include a layer 305 to identify a linguistic input 310. The linguistic input 310 is a layer 305 that identifies natural language in the subimage 210. For example, the linguistic input 310 can be text on a road sign, e.g., "STOP" on a stop sign. The linguistic input 310 can be trained in the computer 110 or the server 130 with a training dataset in which text is included in an annotation and a cost function of the classification program 300 is minimized, as is known.

The classification program 300 can include a plurality of layers 305 that identify a task 315. A "task" is a specified output of a neural network, such as an identification of an object. A multi-task neural network, such as the classification program 300, can output more than one task 315. In this context, the tasks 315 are objects identified in the subimages 210. That is, the layers 305 that identify tasks 315 can be trained to determine a specific type of object in the subimages 210 different from each other task 315. The layers 305 can be trained in the computer 110 or the server 130 with a training dataset, each subimage 210 in the training dataset including an annotation identifying the object in the subimage 210. The classification program 300 then outputs a classification of the object, and the computer 110 can determine whether the output classified object matches the annotation. The computer 110 can input the matching determination to the training dataset.

The classification program 300 can output a plurality of object classifications 320 from the task-specific layers 305. That is, each task-specific layer 305 can output an object classification 320 from the plurality of input subimages 210, and the computer 110 can identify the object in the image 200 based on the outputs. The computer 110 can compare the plurality of object classifications 320 to each other, and when a number of object classifications 320 that are a same object classification 320 exceeds a threshold, the computer 110 determines that the object in the image 200 from which the subimages 210 were generated is the object classification 320. The threshold can be, e.g., 50% of the total number of object classifications 320. That is, the computer 110 can identify the object in the image 200 when a majority of object classifications 320 from the subimages 210 are the same. Alternatively, the threshold can be a different number, e.g., a supermajority. In the example of FIG. 3, two of the object classification 320 outputs are "STOP," indicating a stop sign and that the vehicle 105 should stop, and one of the object classification outputs is "Poster," indicating a poster of a road sign for which the vehicle 105 should not stop. Because a majority of the object classifications 320 are "STOP," the computer 110 can determine that the image 200 includes a stop sign.

When no number of object classifications 320 with the same classified object exceeds the threshold, the computer 110 can determine that the classification program 300 cannot identify the object in the image 200. Then, the computer 110 can input the image 200 to a conventional object detection program. The object detection program can be a machine learning program trained by a computer such as the server 130 to output the object identified in the image 200, e.g., a deep neural network 500 described below in FIG. 5. Because the object detection program may be trained on whole images 200, the object detection program may not identify objects in the subimages 210. Thus, the computer 110 can use the classification program 300 to identify objects in the subimages 210, and when the classification program 300 fails to identify objects, the computer 110 can use the conventional object detection program to identify objects in the image 200. That is, the classification program 300 may typically detect objects more accurately than the conventional object detection program, and only when the classification program 300 fails to detect objects will the computer 110 use the conventional object detection program.

Upon identifying an object in the image 200, whether by the classification program 300 or the object detection program, the computer 110 can actuate a vehicle subsystem 120 based on the identified object. That is, the computer 110 can actuate one or more vehicle subsystems 120 according to the object identified in the image 200. For example, the computer 110 can determine that the object in the image 200 is a stop sign and can actuate a brake to stop the vehicle 105. In another example, the computer 110 can determine that the object in the image 200 is a speed limit sign and can actuate a propulsion according to the posted speed limit.

Figure 4:
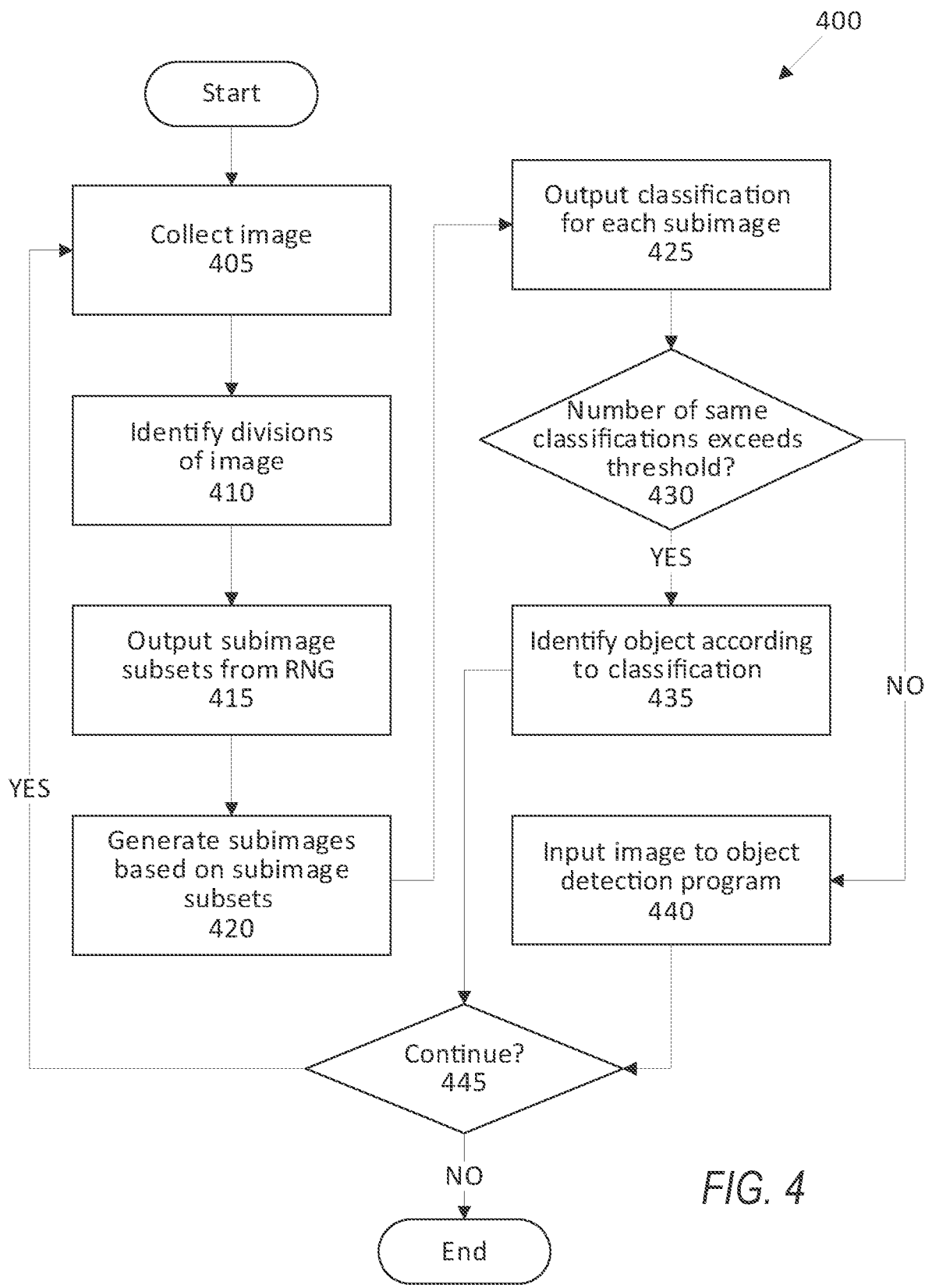
FIG. 4 is a block diagram of an example process for identifying the object in the image.

FIG. 4 is a block diagram of an example process 400 for identifying an object in an image 200. The process 400 begins in a block 405, in which a sensor 115 of a vehicle 105 collects an image 200. As described above, the sensor 115 can collect images 200 of an environment around the vehicle 105. For example, the sensor 115 can be a camera.

Next, in a block 410, the computer 110 identifies a plurality of divisions 205 of the image 200. As described above, the computer 110 can apply a grid pattern to the image 200 to generate the divisions 205. For example, the computer 110 can generate divisions 205 according to a 3×3 grid, as shown in FIG. 2.

Next, in a block 415, the computer 110 outputs a plurality of subimage 210 subsets from a random number generator 215 (RNG). As described above, the RNG 215 outputs a string of identifying numbers, such as integers, that are a subset of the set of identifying numbers comprising the image 200. For example, the RNG 215 can output a subset of the integers from 1-9 indicating divisions 205 of an image 200 divided in a 3×3 grid pattern.

Next, in a block 420, the computer 110 generates a plurality of subimages 210 based on the plurality of subimage subsets output from the RNG 215. As described above, the computer 110 can include divisions 205 of the image 200 identified in one of the subimage subsets to generate a subimage 210 of the image 200.

Next, in a block 425, the computer 110 inputs each subimage 210 to a classification program 300 that outputs an object classification 320 for each subimage 210. As described above, the classification program 300 can output an object classification 320 with a task-based neural network 500, each task 315 outputting an object classification 320 for the image 200 based on the set of subimages 210.

Next, in a block 430, the computer 110 determines whether a number of same object classifications 320 exceeds a threshold. As described above, for the plurality of subimages 210, the classification program 300 outputs a plurality of object classifications 320 for the image 200 that generated the subimages 210. When the number of same object classifications 320 exceeds a threshold, the process 400 continues in a block 435. Otherwise, the process 400 continues in a block 440.

In the block 435, the computer 110 identifies the object in the image 200 according to the object classifications 320 output from the classification program 300. Because the number of same object classifications 320 exceeded the threshold, the computer 110 can determine that the classification program 300 identified an object in the image 200.

In the block 440, the computer 110 inputs the image 200 to an object detection program. As described above, when the classification program 300 fails to identify enough object classifications 320, the computer 110 can determine that the classification program 300 failed to identify an object in the image 200. The computer 110 can then input the image 200 into a conventional object detection program, such as a deep neural network 500.

Next, in a block 445, the computer 110 determines whether to continue the process 400. For example, the computer 110 can determine to continue the process 400 while the vehicle 105 is still in motion. If the computer 110 determines to continue, the process 400 returns to the block 405. Otherwise, the process 400 ends.

Figure 5:
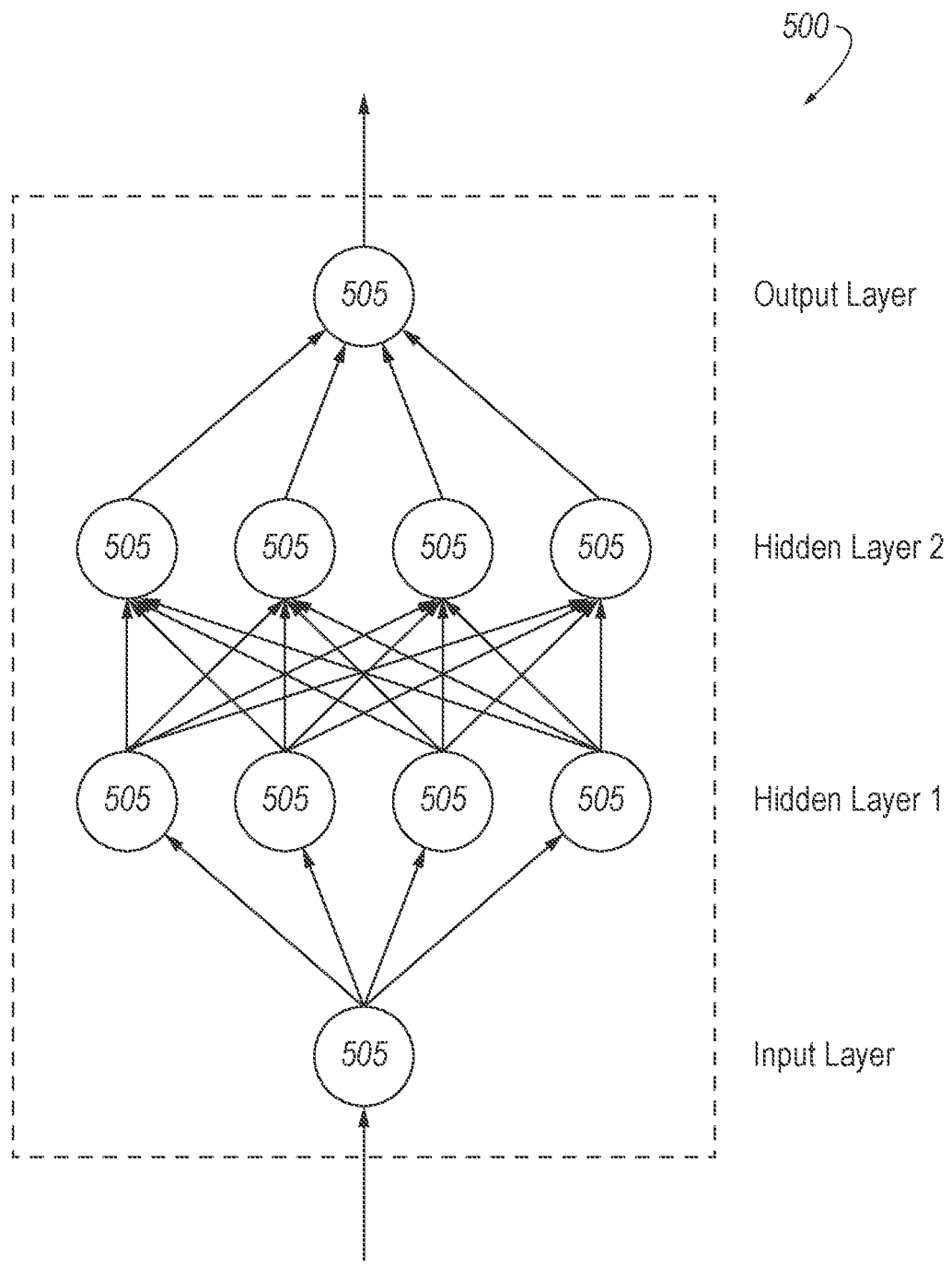
FIG. 5 is a block diagram of an example neural network.

FIG. 5 is a block diagram of an example neural network 500, such as the classification program 300 and/or the object detection program described above.

A neural network 500, such as a deep neural network 500 (DNN) can be a software program that can be loaded in memory and executed by a processor included in a computer 110, for example. In an example implementation, the DNN can include, but is not limited to, a convolutional neural network CNN, R-CNN Region-based CNN, Fast R-CNN, and Faster R-CNN. The DNN includes multiple nodes or neurons 505. The neurons 505 are arranged so that the DNN includes an input layer, one or more hidden layers, and an output layer. Each layer of the DNN can include a plurality of neurons 505. While three hidden layers are illustrated, it is understood that the DNN can include additional or fewer hidden layers. The input and output layers may also include more than one node. As one example, the DNN can be trained with ground truth data, i.e., data about a real-world condition or state. For example, the DNN can be trained with ground truth data and/or updated with additional data. Weights can be initialized by using a Gaussian distribution, for example, and a bias for each node can be set to zero. Training the DNN can include updating weights and biases via suitable techniques such as back-propagation with optimizations. Ground truth data means data deemed to represent a real-world environment, e.g., conditions and/or objects in the environment. Thus, ground truth data can include sensor data depicting an environment, e.g., an object in an environment, along with a label or labels describing the environment, e.g., a label describing the object. Ground truth data can further include or be specified by metadata such as a location or locations at which the ground truth data was obtained, a time of obtaining the ground truth data, etc.

The nodes are sometimes referred to as artificial neurons 505, because they are designed to emulate biological, e.g., human, neurons 505. A set of inputs represented by the arrows to each neuron 505 are each multiplied by respective weights. The weighted inputs can then be summed in an input function to provide, possibly adjusted by a bias, a net input. The net input can then be provided to an activation function, which in turn provides a connected neuron 505 an output. The activation function can be a variety of suitable functions, typically selected based on empirical analysis. As illustrated by the arrows in the figure, neuron 505 outputs can then be provided for inclusion in a set of inputs to one or more neurons 505 in a next layer.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer 110 readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer 110. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 110. Common forms of computer-readable media include, for example, RAM, a PROM, an EPROM, a FLASH-EEPROM, any other memory chip or cartridge, or any other medium from which a computer 110 can read.

Use of in response to, based on, and upon determining herein indicates a causal relationship, not merely a temporal relationship.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a computer including a processor and a memory, the memory storing instructions executable by the processor to:
    generate, based on output from a random number generator, a plurality of subimages, wherein each subimage is a set of at least two divisions of an image, each division of the image being a portion of the image different than each other division of the image;
    input each subimage to a machine learning program trained to output an object classified in the subimage; and
    when a number of subimages with a same classified object exceeds a threshold, identify an object in the image as the classified object.

2. The system of claim 1, wherein the instructions further include instructions to divide the image into a plurality of divisions and to generate the output from the random number generator based on a total number of the plurality of divisions.

3. The system of claim 1, wherein the instructions further include instructions to input an annotation identifying the object in the image to the machine learning program and to determine whether the annotation matches the classified object output from the machine learning program.

4. The system of claim 3, wherein the instructions further include instructions to input the matching determination into a training dataset of the machine learning program.

5. The system of claim 1, wherein the instructions further include instructions to, when no number of subimages with the same classified object exceeds the threshold, input the image to a second machine learning program trained to output the object identified in the image.

6. The system of claim 1, wherein the instructions further include instructions to assign an identifying number to each of the divisions, the identifying numbers defining a set, and the output of the random number generator is a subset of the set of the identifying numbers.

7. The system of claim 1, wherein the machine learning program is a multi-task neural network, wherein each task of the multi-task network is programmed to classify a specific type of object different from the other tasks.

8. The system of claim 1, wherein the instructions further include instructions to identify a plurality of classification regions in the image, each classification region being a region in the image that the machine learning program outputs an identification of an object, and to determine a number of divisions of the image based on the identified plurality of classification regions.

9. The system of claim 8, wherein the instructions further include instructions to generate at least one division that includes no classification regions.

10. The system of claim 1, wherein the instructions further include instructions to, when the object is identified in the image, actuate a vehicle subsystem based on the identified object.

11. The system of claim 1, wherein the instructions further include instructions to divide the image into a plurality of equally-sized divisions in a grid pattern.

12. The system of claim 11, wherein the instructions further include instructions to generate the plurality of subimages based on the divisions in the grid pattern, to divide the image into a second plurality of equally-sized divisions in a second grid pattern, and to generate a second plurality of subimages based on the divisions in the second grid pattern.

13. A method, comprising:
generating, based on output from a random number generator, a plurality of subimages, wherein each subimage is a set of at least two divisions of an image, each division of the image being a portion of the image different than each other division of the image;
inputting each subimage to a machine learning program trained to output an object classified in the subimage; and
when a number of subimages with a same classified object exceeds a threshold, identifying an object in the image as the classified object.

14. The method of claim 13, further comprising dividing the image into a plurality of divisions and generating the output from the random number generator based on a total number of the plurality of divisions.

15. The method of claim 13, further comprising inputting an annotation identifying the object in the image to the machine learning program and determining whether the annotation matches the classified object output from the machine learning program.

16. The method of claim 13, further comprising, when no number of subimages with the same classified object exceeds the threshold, inputting the image to a second machine learning program trained to output the object identified in the image.

17. The method of claim 13, further comprising assigning an identifying number to each of the divisions, the identifying numbers defining a set, and the output of the random number generator is a subset of the set of the identifying numbers.

18. The method of claim 13, wherein the machine learning program is a multi-task neural network, wherein each task of the multi-task network is programmed to classify a specific type of object different from the other tasks.

19. The method of claim 13, further comprising, when the object is identified in the image, actuating a vehicle subsystem based on the identified object.

20. The method of claim 13, further comprising dividing the image into a plurality of equally-sized divisions in a grid pattern.

\* \* \* \* \*